United States Patent [19]
Borrelli et al.

[11] Patent Number: 5,896,484
[45] Date of Patent: Apr. 20, 1999

[54] METHOD OF MAKING A SYMMETRICAL OPTICAL WAVEGUIDE

[75] Inventors: Nicholas F. Borrelli, Elmira, N.Y.; Christian Lerminiaux, Fontainebleau, France; Richard O. Maschmeyer, Corning, N.Y.

[73] Assignee: Corning Incorporated, Corning, N.Y.

[21] Appl. No.: 08/787,466

[22] Filed: Jan. 22, 1997

Related U.S. Application Data

[60] Provisional application No. 60/011,713, Feb. 15, 1996.

[51] Int. Cl.⁶ .................................................. G02B 6/10
[52] U.S. Cl. ...................... 385/132; 385/147; 385/142; 385/144; 359/900
[58] Field of Search ............................ 385/129–132, 385/147, 142, 144; 359/900

[56] References Cited

U.S. PATENT DOCUMENTS

| | | | |
|---|---|---|---|
| 3,542,536 | 11/1970 | Flam et al. | 65/111 |
| 3,880,630 | 4/1975 | Izawa | 65/30 |
| 4,402,570 | 9/1983 | Chang | 350/96.3 |
| 4,948,407 | 8/1990 | Bindell et al. | 65/3.14 |
| 5,042,895 | 8/1991 | Chouinard et al. | 385/2 |
| 5,178,658 | 1/1993 | Tumminelli et al. | 65/30.1 |
| 5,193,136 | 3/1993 | Chang et al. | 385/129 |
| 5,194,079 | 3/1993 | Tumminelli et al. | 65/3.11 |
| 5,218,655 | 6/1993 | Mizrahi | 385/39 |
| 5,235,659 | 8/1993 | Atkins et al. | 385/124 |
| 5,287,427 | 2/1994 | Atkins et al. | 385/124 |
| 5,323,404 | 6/1994 | Grubb | 372/6 |
| 5,337,382 | 8/1994 | Mizrahi | 385/37 |
| 5,416,863 | 5/1995 | Vengsarkar | 385/28 |

*Primary Examiner*—Hung N. Ngo
*Attorney, Agent, or Firm*—William Greener

[57] ABSTRACT

A structure for use in forming an optical component and a method of making such a component is described. The structure comprises a non-waveguiding body of optical material having a concentration of a photorefractive-sensitive component in the body such that upon irradiation of a part of the body by a beam of actinic radiation, the refractive index of the irradiated part is increased. The method of making the optical component comprises providing a non-waveguiding body of optical material; providing a concentration of a photorefractive-sensitive component in the body; contacting the non-waveguiding body of optical material with an atmosphere comprising one of hydrogen, deuterium and mixtures thereof; and exposing a part of the non-waveguiding body of optical material to actinic radiation such that the refractive index of the exposed part is increased. Such a structure and method can be used to form symmetrical planar waveguides, optical fiber waveguides and other optical components such as gratings.

24 Claims, 1 Drawing Sheet

METHOD OF MAKING A SYMMETRICAL OPTICAL WAVEGUIDE

This application claims the benefit under 35 USC §119(e) of U.S. Provistonal Application No. 60/011713, filed Feb. 15, 1996.

FIELD OF THE INVENTION

This invention relates generally to a method for making optical devices, such as a planar waveguide, and in particular, to a method for making an optical waveguide device from an initially non-waveguiding structure that contains a photorefractive-sensitive component, hydrogen loading the structure and selectively exposing a part of the structure to actinic radiation to change the refractive index of the part and form a waveguide. It also relates to structures for use with this method and to articles made by this method.

BACKGROUND OF THE INVENTION

In-line optical fiber diffraction gratings are known. One method writing an in-line grating into optical fiber comprises interfering two beams of actinic (typically UV) radiation in a portion of the fiber. The two beams are incident on the fiber in a transverse direction, the angle between the two beams (and the wavelength of the radiation) defining the grating spacing. Typically fiber gratings are formed in germanium-doped fiber and the sensitivity of the germanium doped fiber to actinic radiation is enhanced by a thermal hydrogen treatment. The hydrogen loading is done at a pre-determined pressure and temperature. This method can be used to write gratings in fiber or planar silica waveguides and to write a channel into the core layer of planar optical waveguides. The waveguide glass, for example a silica glass, must contain a photorefractive-sensitive component, such as germanium dioxide.

U.S. Pat. No. 5,235,659 and related U.S. Pat. No. 5,287,427 disclose that large normalized refractive index changes can be obtained in silica-based optical waveguides (fiber or planar waveguides) by a treatment that comprises exposing at least a portion of the waveguide at a temperature of at most 250° C. to hydrogen at moderate pressures and irradiating a part of the exposed portion with actinic radiation. In particular, there is disclosed a method for modifying the refractive index of planar waveguides (col. 5, line 34 to col. 6, line 9). A layered structure comprising, for example, a silicon substrate on which is formed a lower cladding layer of vitreous silica, an intermediate (core) germanosilicate layer, and an upper cladding layer of vitreous silica is formed. This structure has waveguiding properties in the vertical plane of the core layer but does not confine the radiation in the horizontal plane of the core layer. Horizontal confinement is achieved by loading the structure with hydrogen, irradiating the structure with focused actinic radiation normal to the layered structure, and moving the beam over the structure in a predetermined manner. The refractive index in the irradiated region of the germanosilicate core layer is raised above the adjacent lateral portions of the core layer, providing lateral guiding. The refractive index of the cladding layers remains essentially unchanged.

In such a structure, as described in U.S. Pat. 5,235,659, the writing is done in a layered structure already presenting planar waveguide properties because vertical confinement is already provided by the fact that the core layer containing germanium dopant has a refractive index above the refractive indices of the underclad and overclad layers which lack the dopant. After the writing is done the refractive index of the irradiated region of the core layer is further increased. The difference in refractive index between the written region of the core and the cladding layers above and below will be greater than the difference in refractive index between the written region of the core and the adjacent lateral regions of the core layer which contain dopant. A disadvantage of such a planar waveguide is that it is an unsymmetrical waveguide, i.e. the difference in refractive index between the written region and adjacent regions is not the same in all directions. In such a structure the difference in index is larger between the channel waveguide and the surrounding structure in the vertical dimension than in the horizontal one. Therefore the mode is less guided horizontally and expands in this direction.

Unsymmetrical waveguides are disadvantageous because of the asymmetric mode field propagated in such a structure. Consequences include an increase in the coupling losses with single mode fiber and a large polarization dependence. The mode field of the unsymmetrical waveguide can be made circularly symmetric by making the waveguide cross-section rectangular, for example, taller than it is wide. This approach will overcome the problem of higher coupling losses. However, this approach still suffers from the fact that coupling will occur between the channel waveguide and the planar or "slab" waveguide. This coupling will result in consmission losses at selected wavelengths corresponding to the equalization of the propagation constant of the eigenmode of the channel waveguide to those (several) of the planar waveguide. The invention for a symmetrical planar waveguide has no "slab" waveguide, so these losses will not occur.

It is an object of this invention to provide a non-waveguiding structure for use in making waveguides with symmetrical waveguide properties.

SUMMARY OF THE INVENTION

Briefly stated, this invention provides a structure for use in forming an optical component comprising a non-waveguiding body of optical material; and a concentration of a photorefractive-sensitive component in the body such that upon irradiation of a part of the body by a beam of actinic radiation, the refractive index of the irradiated part is increased.

In another aspect of the invention there is provided a method of making an optical component comprising providing a non-waveguiding body of optical material; providing a concentration of a photorefractive-sensitive component in the body; contacting the non-waveguiding body of optical material with an atmosphere comprising one of hydrogen, deuterium and mixtures thereof; and exposing a part of the non-waveguiding body of optical material to actinic radiation such that the refractive index of the exposed part is increased.

Such a structure and method can be used to form symmetrical planar waveguides, optical fiber waveguides and other optical components such as gratings.

In another aspect of the invention there is provided a structure for use in forming a symmetrical planar waveguide comprising first and second layers of optical material having an index of refraction of a selected value; and a third layer of optical material disposed between the first and second layers comprising a selected concentration of a photorefractive-sensitive component to make the index of refraction of the third layer sufficiently close to the value of the first and second layers to prevent waveguiding.

In another aspect of this invention there is provided a method of making a symmetrical planar waveguide comprising providing first and second layers of optical material having an index of refraction of a selected value; and providing a third layer of optical material disposed between the first and second layers comprising a selected concentration of a photorefractive-sensitive component to make the index of refraction of the third layer sufficiently close to the value of the first and second layers to prevent waveguiding; contacting at least the third layer of optical material with an atmosphere comprising one of hydrogen, deuterium and mixtures thereof; and exposing a part of the third layer of optical material to actinic radiation such that the refractive index of the exposed part is changed sufficiently to create the symmetrical waveguide.

In another aspect of the invention there is provided a symmetrical planar waveguide comprising first and second layers of optical material having an index of refraction of a selected value; a third layer of optical material disposed between the first and second layers comprising a selected concentration of a photorefractive-sensitive component to make the index of refraction of the third layer sufficiently close to the value of the first and second layers to prevent waveguiding; and a region within the third layer having an increased index of refraction formed by exposure to a beam of actinic radiation sufficient to create the symmetrical waveguide.

In another aspect of the invention there is provided a structure for use in forming an optical fiber waveguide comprising a cladding layer of optical fiber material having an index of refraction of a selected value; and a core of optical fiber material surrounded by the cladding layer comprising a selected concentration of a photorefractive-sensitive component to make the index of refraction of the core sufficiently close to the value of the cladding layer to prevent waveguiding. In another aspect of the invention there is provided a method of making an optical fiber waveguide comprising providing a cladding layer of optical fiber material having an index of refraction of a selected value; providing a core of optical fiber material surrounded by the cladding layer comprising a selected concentration of a photorefractive-sensitive component to make the index of refraction of the core sufficiently close to the value of the cladding layer to prevent waveguiding; contacting at least the core optical fiber material with an atmosphere comprising one of hydrogen, deuterium and mixtures thereof; and exposing a part of the core optical material to actinic radiation such that the refractive index of the exposed part is changed sufficiently to create the waveguide.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

An optical waveguide, as discussed herein, is typically an elongated structure that comprises a core of relatively high refractive index glass that is at least partially surrounded by a cladding of relatively low refractive index material, and that is adapted for transmitting therethrough electromagnetic radiation of optical wavelength. For effective single mode waveguides, the desired difference in refractive index (normalized delta) is greater than $10^{-4}$, preferably from $10^{-3}$ to $10^{-2}$ or greater.

This invention relates to a method of making an optical component, for example, a planar waveguide, a fiber waveguide and an optical grating in fiber or planar waveguides, from a non-waveguiding structure. In one embodiment of the invention for preparing a symmetrical planar waveguide, the method includes providing a structure comprising a non-waveguiding body of oxide glass, exposing the structure to hydrogen and irradiating a part of the structure with actinic radiation such that the refractive index of the irradiated portion is changed and a waveguiding channel is formed.

Figure 1:
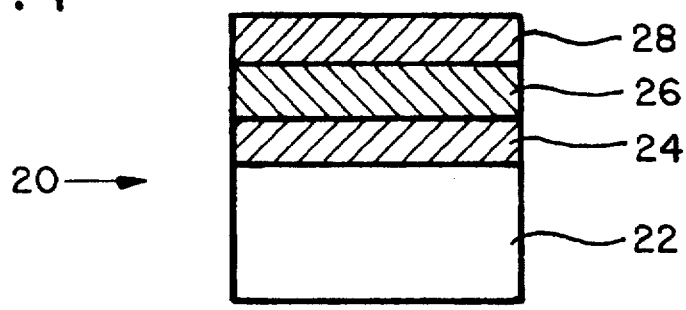
FIG. 1 is a schematic drawing of a structure used to form a waveguide.

FIG. 1 illustrates a structure 20 for use in preparing a planar waveguide. The structure 20 includes an optional substrate 22, a lower cladding layer 24, a core layer 26 and an upper cladding layer 28. The substrate 22 is usually a silicon or silicon dioxide wafer on which the waveguide layers are deposited. However, in some structures the lower cladding layer serves as the substrate layer. In prior art waveguides the lower and upper cladding layers 24, 28 are usually of silica glass, each layer having a refractive index $n_0$. Typically layer 24 is vitreous silica and layer 28 is a silica containing boron oxide and phosphorous pentoxide and having a refractive index equal to that of vitreous silica. The core layer 26 is generally a germanosilicate, i.e. a vitreous silica doped with photorefractive-sensitive germanium oxide, having an index of refraction $n_1$, where $n_1 > n_0$. Typically the delta is about $10^{-5}$. Such a structure has waveguiding properties normal to the layers. Hydrogen loading of the structure and subsequent actinic radiation of a selected region of the core layer containing the photorefractive-sensitive germanium increases the refractive index of the irradiated region to $n_2$, where $n_2 > n_1 > n_0$. The refractive indices of the cladding layers and the remainder of the core layer are essentially unchanged. Such a structure now has a defined waveguide region within the core layer, wherein the difference in the refractive index between the irradiated region of the core and the adjacent cladding layers is greater than the difference in refractive index between the irradiated region of the core and the adjacent core layer in the lateral direction and thus an unsymmetrical (slab) waveguide is defined.

In the waveguide of the invention the core layer 26 is generally a photorefractive-sensitive oxide glass layer having an index of refraction $n_*$. The oxide glass generally comprises germanium oxide as the photorefractive-sensitive dopant. Suitable glasses include germanosilicates in which silicon dioxide is the main component. The germania content of high silica glass required to achieve the photorefractive effect necessary to write waveguides is preferably greater than 10 weight percent. However, an oxide glass in which germanium dioxide is the main component may also be used. An important feature of the invention is that the cladding layers 24, 28 comprise an oxide glass, for example a silica glass, having an index of refraction $n_0$, where $n_1$, is approximately equal to $n_0$. Such a structure does not have any waveguiding properties as all three layers have essentially the same refractive index. It is possible for $n_0$, to be slightly more or less than $n_0$, as long as waveguiding at the wavelength of interest does not occur.

In a preferred embodiment of the invention, in which the cladding layers and the core layer comprise a silica glass, the cladding layers can, in addition, contain a photorefractive-insensitive component for raising the refractive index to approximately that of the core layer silica glass which contains a photorefractive-sensitive component such as germanium dioxide. Suitable photorefractive-insensitive compounds for raising the refractive index include titanium dioxide and phosphorous pentoxide. In another embodiment of the invention a photorefractive-insensitive component which lowers the refractive index of the glass, for example boron oxide, can be added to the cladding layer. Similarly, the core layer can contain in addition to the photorefractive-sensitive component varying amounts of photorefractive-insensitive components for increasing or decreasing its refractive index to match that of the cladding layers.

In a typical embodiment of the invention one or more photorefractive-insensitive components are added to all three layers and a photorefractive-sensitive component is present only in the core layer to allow the refractive index matching.

Figure 2:
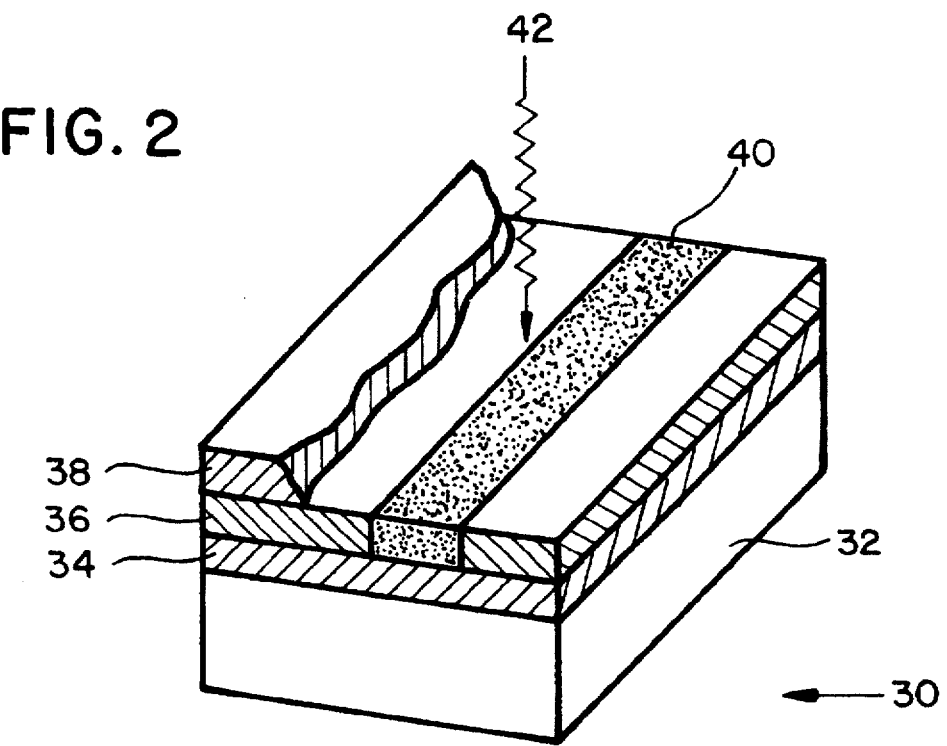
FIG. 2 is a schematic drawing of a planar waveguide.

Referring now to FIG. 2 there is shown a waveguide structure 30 of the invention having a substrate layer 32, a lower cladding layer 34, a core layer 36 and an upper cladding layer 38, with the upper cladding layer partially removed for clarity. Both the lower cladding layer and the upper cladding layer have an index of refraction of $n_0$, and the core layer has an index of refraction of $n_1$, where $n_0$ and $n_1$ are essentially equal. Such a structure 30 is non-waveguiding In order to create a waveguide in the waveguide structure the planar structure 30 is first loaded with molecular hydrogen. In certain applications deuterium or a mixture of hydrogen and deuterium can be used. The higher the concentration of molecular hydrogen after loading, the greater the induced refractive index change. The hydrogen impregnation is done at a high enough temperature to cause diffusion without allowing the hydrogen to react with the glass. It is also preferably done under high pressure, for example 100 atmospheres. The concentration of hydrogen achieved is linear with the loading pressure. The time of loading is dictated by the depth below the surface to which penetration is desired. The hydrogen, thus loaded, enhances the photo-reaction within the glass and on actinic radiation produces the refractive index change.

Hydrogen loading of the planar structures is typically done at between 20° C. and 250° C. and between 10 and 300 atmospheres of hydrogen over a period of from 12 hours to 7 days. Exposure of the thus prepared structures to UV radiation of about 248 nm from an eximer laser, for example at 20 pulses/sec., 240 mJ/pulse for a period of 0.5–2 hours, induces a desired change in refractive index.

A desired increase in refractive index for a structure of the invention is obtained by maintaining a planar structure comprising a 10 mm thick layer of $SiO_2$, having an underlying layer of a doped silica glass (79 wt % $SiO_2$, 5 wt % $B_2O_3$, 2 wt % $P_2O_5$, and 14 wt % $GeO_2$)with a thickness of 6 mm at 85° C. for 3 days in 100 atmospheres of hydrogen. Exposure of this structure to UV radiation of about 248 nm from an eximer laser, at 20 pulses/sec., 300 mJ/pulse for a period of 0.5 hours, induces a change in refractive index of $5.5 \times 10^{-3}$.

An exemplary result, disclosed in U.S. Pat. No. 5,287,427, requires maintaining a planar structure comprising a 25 mm thick layer of $SiO_2$, with an underlying germanosilicate glass layer (8 mm thick, 2.6 mole % $GeO_2$) at 21° C. for 6 days in 187 atmospheres hydrogen. This is estimated to result in sufficient hydrogen loading to generate a waveguide core in the germania-doped glass with a refractive index change of $4 \times 10^{-3}$ after exposure to UV radiation. One of ordinary skill in the art generally will be able to determine with minimal experimentation which set of conditions is required to induce the desired change in refractive index.

Referring again to FIG. 2, a defined region 40 of the structure 30 is exposed to actinic radiation 42, such as UV light, to define the waveguide. The exposure might be in the form of a focused beam with a waist on the order of a few microns or by exposure through a mask. The refractive index of the irradiated region 40 of the core is thereby increased to $n_2$, such that $n_2 > n_1$, and $n_1 = n_0$. Such a structure now has a defined waveguide region (or channel) 40 within the core layer 36, wherein the difference in the refractive index between channel and the adjacent cladding layers in the vertical direction and the difference in refractive index between the channel and the adjacent core layer in the lateral direction are essentially the same and thus a symmetrical waveguide is defined. The shape of the waveguide is not critical and since there is no "slab" waveguide effect there are no transmission losses.

In a planar waveguide of the invention the core layer, preferably, comprises a germanosilicate glass containing 50–90 wt % $SiO_2$, 0–20 wt % $B_2O_3$, 0–10 wt % $P_2O_5$, and 1–30 wt % $GeO_2$.

In one preferred embodiment the core layer comprises 79 wt % $SiO_2$, 5 wt % $B_2O_3$, 2 wt % $P_2O_5$, and 14 wt % $GeO_2$.

In another preferred embodiment the core layer comprises 63 wt % $SiO_2$, 7 wt % $B_2O_3$, 8 wt % $P_2O_5$, and 23 wt % $GeO_2$.

In a planar waveguide of the invention the cladding layer is, preferably, formed of a similar glass to that of the core layer absent the germanium oxide. The desired matching refractive index is achieved by varying the levels of the constituents, for example, 50–100 wt % $SiO_2$, 0–20 wt % $B_2O_3$, and 0–30 wt % $P_2O_5$.

It is also possible to have a structure with different concentrations of a photorefractive-sensitive component in each optical layer together with appropriate concentrations of photorefractive-insensitive components so that each layer has essentially the same refractive index. On hydrogen loading and irradiation of the structure with actinic radiation a symmetrical waveguide is formed in the core layer.

The symmetrical planar waveguide obtained by this invention from an initially non-waveguiding structure results in a light guiding structure with a biaxially symmetric mode field having identical propagation constants in the in-plane and normal-to-the-plane directions. Significant coupling losses are prevented and the risk of geometrical birefringence (polarization dependence) is eliminated.

The invention also offers different ranges of compositions for the realization of the different layers.

The invention described above can be embodied in a variety of optical devices, including optical fiber waveguides. Other potential applications include, on-line tuning of fiber delta, dispersion decreasing fiber for soliton propagation, dispersion managed fiber, adiabatic tapers, gratings, sensors and the like.

Figure 3:
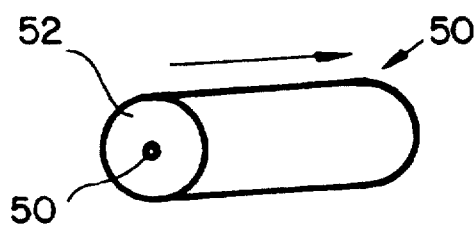
FIG. 3 is a schematic drawing of an optical fiber waveguide.

Referring to FIG. 3, there is shown a structure 50 for use in forming an optical fiber waveguide that includes a cladding layer 52 of optical fiber material surrounding a core 54 of optical fiber material. The core 54 contains a quantity of a photo-refractive sensitive component so that the index of refraction of the cladding layer and the core are sufficiently close to prevent waveguiding before actinic irradiation. The material of the cladding layer is similar to that described above for the cladding layers of the symmetrical planar waveguide. The optical fiber core is preferably an oxide glass doped with a photorefractive-sensitive component, for example, a silica glass doped with germania, or a germania glass. Hydrogen loading and UV irradiation of the core are carried out in essentially the same manner as for the symmetrical planar waveguide described above to create a waveguiding channel in the core. The channel would be created by UV exposure, either uniform or varying in intensity. The normalized index differential (delta) between the cladding and the core can be uniform or can vary along the length of the core. By varying the intensity and/or duration of the irradiation, other features, such as gratings, can also be written into the core.

Starting with the refractive index of the core and cladding layer equal or nearly matched allows the core to contain a large amount of photorefractive-sensitive material, for example, greater than 10 wt % germania, without forcing the delta of the fiber to be high everywhere. A high content of photorefractive-sensitive material is desirable because it allows a strong photorefractive effect, making it easier to write structures into the fiber. A low delta is desirable to minimize coupling losses to standard telecommunication fiber.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. An optical article providing symmetric waveguiding properties, comprising:
    a body of optical material comprising a core region having an index, $n_1$, and cladding region having an index, $n_0$, wherein the cladding region comprises first and second layers of optical material of index, $n_0$, and the core region comprises a third layer of index, $n_1$, disposed between the first and second cladding layers, wherein $n_1$ is sufficiently close to $n_0$ such that the material has a substantially uniform index of refraction and is without a defractive waveguiding region at a wavelength of interest,
    a photorefractive-sensitive material selectively located within a region including at least one of the cladding and the core regions,
    whereupon exposure of the photorefractive-sensitive region to actinic radiation, a biaxially symmetric change in the index of refraction between the photorefractive-sensitive region and a non-photorefractive-sensitive surrounding region provides a symmetrical waveguiding region in the body.

2. The article of claim 1, wherein the symmetrical waveguiding region in the body is a channel in the core region of the body.

3. The article of claim 1, wherein the body of optical material comprises an oxide glass.

4. The article of claim 3, wherein the oxide glass comprises a silica glass.

5. The article of claim 1, wherein the photorefractive-sensitive material is germanium dioxide in the core region of the body.

6. The article of claim 5, comprising at least 43 weight % germanium dioxide.

7. The article of claim 1, wherein the cladding region includes at least one of the non-photorefractive-sensitive materials boron oxide, phosphorous pentoxide, titanium dioxide, and mixtures thereof.

8. The article of claim 1, wherein the core region includes at least one of the non-photorefractive-sensitive materials boron oxide, phosphorous pentoxide, titanium dioxide, and mixtures thereof.

9. The article of claim 1, wherein the core region comprises a germanosilicate glass including 50–90 wt % $SiO_2$, 0–20 wt % $B_2O_3$, 0–10 wt % $P_2O_5$, and 1–30 wt % $GeO_2$.

10. The article of claim 1, wherein the cladding region comprises a silica glass including 50–100 wt % $SiO_2$, 0–20 wt % $B_2O_3$, and 0–30 wt % $P_2O_5$.

11. The article of claim 1, wherein the core region comprises one of hydrogen, deuterium and mixtures thereof.

12. The article of claim 1, wherein the article is a planar symmetrical waveguide.

13. A method of making an optical article having symmetric waveguiding properties, comprising the steps of:
    a) providing a body of optical material having a core region with an index of refraction, $n_1$, and a cladding region with an index of refraction, $n_0$, adjacent the core region, wherein at least one of the core region and the cladding region comprises a selected concentration of a photorefractive-sensitive material such that $n_0$ and $n_1$ are sufficiently close so that the body is non-waveguiding for a wavelength of interest;
    b) contacting at least a portion of the body comprising the photorefractive sensitive material with an atmosphere comprising one of hydrogen, deuterium and mixtures thereof; and
    c) exposing at least a part of the body comprising the photorefractive-sensitive material to actinic radiation such that the refractive index of the exposed part is changed and a symmetric waveguiding region is formed in the body.

14. The method according to claim 13 wherein the step of providing a body of optical material having a core region and a cladding region comprises providing a first and a second layer of cladding material and a third layer of core material intermediate the cladding layers.

15. The method according to claim 14 further comprising exposing a part of the third layer to the actinic radiation for forming a symmetrical waveguiding region in the body.

16. The method according to claim 13 wherein the photorefractive sensitive material is germanium dioxide.

17. The method according to claim 13 wherein the cladding region comprises a photorefractive-insensitive material.

18. The method according to claim 17 wherein the photorefractive-insensitive material is one of boron oxide, phosphorous pentoxide, titanium dioxide, and mixtures thereof.

19. The method according to claim 13 wherein the core region comprises a photorefractive-insensitive material.

20. The method according to claim 19 wherein the photorefractive-insensitive material is one of boron oxide, phosphorous pentoxide, titanium dioxide, and mixtures thereof.

21. The method according to claim 13 wherein the exposing at least a part of the body comprising the photorefractive-sensitive material to actinic radiation comprises increasing the index of refraction of the core region relative to the cladding region to form a light guiding channel in the core region.

22. The method according to claim 13 wherein the core and cladding regions comprise a silica glass.

23. The method according to claim 13 comprising making an optical fiber waveguide.

24. The method according to claim 13 comprising making a symmetric planar waveguide.

* * * * *